(12) United States Patent
Phelan et al.

(10) Patent No.: US 10,423,454 B2
(45) Date of Patent: *Sep. 24, 2019

(54) ALLOCATION OF LARGE SCALE PROCESSING JOB PROCESSES TO HOST COMPUTING SYSTEMS

(71) Applicant: HEWLETT PACKARD ENTERPRISE DEVELOPMENT LP, Houston, TX (US)

(72) Inventors: Thomas A. Phelan, San Francisco, CA (US); Michael J. Moretti, Saratoga, CA (US); Joel Baxter, San Carlos, CA (US); Gunaseelan Lakshminarayanan, Cupertino, CA (US); Kumar Sreekanti, Pleasanton, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/643,504

(22) Filed: Mar. 10, 2015

(65) Prior Publication Data
US 2016/0266932 A1    Sep. 15, 2016

(51) Int. Cl.
*G06F 9/50*   (2006.01)
*H04L 29/08*   (2006.01)
*G06F 9/455*   (2018.01)

(52) U.S. Cl.
CPC ........ *G06F 9/5016* (2013.01); *G06F 9/45533* (2013.01); *G06F 9/45545* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2010/0306445 | A1* | 12/2010 | Dake | G06F 3/0604 711/6 |
| 2013/0086593 | A1* | 4/2013 | Sloma | G06F 9/505 718/105 |
| 2013/0290954 | A1* | 10/2013 | Dorland | G06F 9/45558 718/1 |
| 2013/0290976 | A1* | 10/2013 | Cherkasova | G06F 9/5038 718/104 |
| 2013/0312007 | A1* | 11/2013 | Millman | G06F 9/526 718/106 |

(Continued)

*Primary Examiner* — Wynuel S Aquino
(74) *Attorney, Agent, or Firm* — Hewlett Packard Enterprise Patent Department

(57) ABSTRACT

Systems, methods, and software described herein facilitate the allocation of large scale processing jobs to host computing systems. In one example, a method of operating an administration node to allocate processes to a plurality of host computing systems includes identifying a job process for a large scale processing environment (LSPE), and identifying a data repository associated with the job process. The method further includes obtaining data retrieval performance information related to the data repository and the host systems in the LSPE. The method also provides identifying a host system in the host systems for the job process based on the data retrieval performance information, and initiating a virtual node for the job process on the identified host system.

19 Claims, 8 Drawing Sheets

(56) References Cited

U.S. PATENT DOCUMENTS

| | | | |
|---|---|---|---|
| 2013/0326535 A1* | 12/2013 | Matsuda | G06F 9/50 |
| | | | 718/104 |
| 2013/0346967 A1* | 12/2013 | Anand | G06F 9/45533 |
| | | | 718/1 |
| 2015/0074672 A1* | 3/2015 | Yeddanapudi | H04L 47/11 |
| | | | 718/103 |
| 2016/0253212 A1* | 9/2016 | Solihin | G06F 9/5033 |
| | | | 718/104 |

* cited by examiner

| DATA STRUCTURE 400 | | | |
|---|---|---|---|
| HOST COMPUTING SYSTEMS 410 | PERFORMANCE INFORMATION 420 | PERFORMANCE INFORMATION 421 | PERFORMANCE SCORES 440 |
| SYSTEM 411 | INFO 431 | INFO 435 | SCORE 441 |
| SYSTEM 412 | INFO 432 | INFO 436 | SCORE 442 |
| SYSTEM 413 | INFO 433 | INFO 437 | SCORE 443 |
| .... | .... | .... | .... |
| SYSTEM 414 | INFO 434 | INFO 438 | SCORE 444 |

FIGURE 4

ALLOCATION OF LARGE SCALE PROCESSING JOB PROCESSES TO HOST COMPUTING SYSTEMS

TECHNICAL FIELD

Aspects of the disclosure are related to computing hardware and software technology, and in particular to the allocation of job processes to host computing systems.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Amazon S3, and CloudStore, among others.

At the same time, virtualization techniques have gained popularity and are now commonplace in data centers and other computing environments in which it is useful to increase the efficiency with which computing resources are used. In a virtualized environment, one or more virtual machines are instantiated on an underlying host computer (or another virtual machine) and share the resources of the underlying computer. However, deploying data-intensive distributed applications across clusters of virtual machines has generally proven impractical due to the latency associated with feeding large data sets to the applications.

In some examples, virtual data processing nodes on host computing systems may operate independent of the required data storage repositories. Accordingly, any of the processing nodes within the environment may be used to process data from any of the storage repositories within the system. However, as the environments become more complex with more computing systems and data storage locations, inefficiencies may arise in the allocation of virtual nodes and job processes to the host computing systems.

OVERVIEW

Provided herein are systems, methods, and software for the allocation of large scale processing jobs to host computing systems. In one example, apparatus to allocate job processes to a plurality of host computing systems in a large scale processing environment includes one or more computer readable storage media. The apparatus further includes processing instructions stored on the one or more computer readable media that direct a processing system to at least identify a job process for the large scale processing environment, and identify a data repository associated with the job process. The processing instructions further direct the processing system to obtain data retrieval performance information related to the data repository for each host computing system in the plurality of host computing systems, and identify a host computing system in the plurality of host computing systems to execute a virtual node for the job process based on the data retrieval performance information. The processing instructions also direct the processing system to initiate the virtual node on the host computing system for the job process.

In another instance, a method of operating an administration node to allocate job processes to a plurality of host computing systems in a large scale processing environment includes identifying a job process for the large scale processing environment, and identifying a data repository associated with the job process. The method further includes obtaining data retrieval performance information related to the data repository for each host computing system in the plurality of host computing systems, and identifying a host computing system in the plurality of host computing systems to execute a virtual node for the job process based on the data retrieval performance information. The method also provides initiating the virtual node in the host computing system for the job process.

In another example, a system to allocate job processes amongst a plurality of host computing systems includes an administration node configured to identify a job process for the plurality of host computing systems, identify a data repository associated with the job process, and transfer a request for data retrieval performance information related to the data repository to each host computing system in the plurality of host computing systems. The system further includes the plurality of host computing systems each configured to receive the request, identify the data retrieval performance information related to the data repository, and transfer the data retrieval performance information to the administration node. The administration node is further configured to receive the data retrieval performance information related to the data repository from each host computing system in the plurality of host computing systems, and identify a host computing system in the plurality of host computing systems to execute a virtual node for the job process based on the data retrieval performance information. The administration node is also configured to initiate the virtual node in the host computing system for the job process.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a data structure for identifying a host computing system to allocate a virtual node based on data retrieval information.

TECHNICAL DISCLOSURE

Large scale processing environments (LSPEs) may employ a plurality of physical computing systems to provide efficient processing of job processes across a plurality of virtual nodes. These virtual nodes may include full operating system virtual machines, Linux containers, jails, or other similar types of virtual containment nodes. In addition to the virtual processing nodes, data sources are made available to the virtual processing nodes that may be stored on the same physical computing systems or on separate physical computing systems and devices. These data sources may be stored using Hadoop distributed file system (HDFS), versions of the Google file system, versions of the Gluster file system (GlusterFS), or any other distributed file system version—including combinations thereof.

To efficiently assign job processes, such as Apache Hadoop processes, Apache Spark processes, Disco processes, or other similar job processes, to the host computing systems within a LSPE, the host computing systems may be configured to identify data retrieval information associated with a particular storage repository. For example, a user may generate a job process that requires access to a particular HDFS repository. Once the repository is identified, data retrieval information may be obtained for each of the host systems within the environment to determine which host is the best access point for the data. This data retrieval information may include the physical distance of the host computing system from the data repository, the ping time associated with accessing the data repository, the amount of bandwidth between the host system and the repository, or any other similar retrieval information, including combinations thereof.

In at least one example, an administration node is configured to identify the new job process and obtain the data retrieval information from each of the hosts within the environment. Once the retrieval information is received, the administration node may apply algorithms to the information to determine the host computing system that may most efficiently access the data. In one instance, the algorithms that are applied to the retrieval information may be used to develop a score for each of the computing systems. Accordingly, once a score is determined for each of the systems, the administration node may identify the score related to the best retrieval information, and allocate a virtual machine to the host computing system associated with the score. In some example, the allocation may include initiating the virtual machine within the host computing system. In other examples, the host may already be executing an available virtual node, and the job process may be assigned to the available virtual node. Once allocated, the job process may execute via the virtual node to provide a response to the original query.

Figure 1:
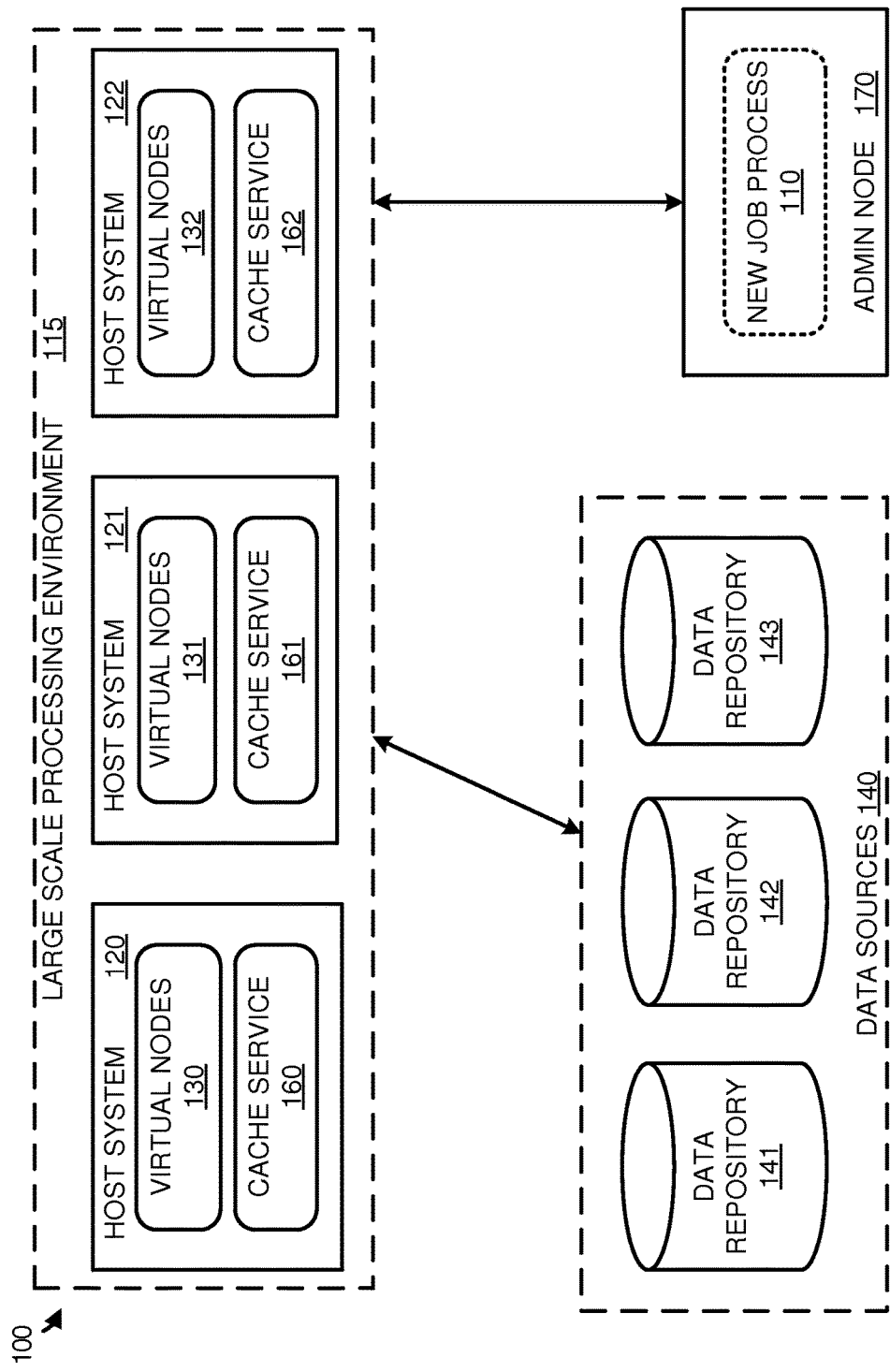
FIG. 1 illustrates a system to allocate virtual nodes based on data retrieval information from host computing systems.

Referring now to FIG. 1, FIG. 1 illustrates a system 100 to allocate virtual nodes based on data retrieval information from host computing systems. System 100 includes large scale processing environment (LSPE) 115, data sources 140, and administration (admin) node 170. LSPE 115 further includes host systems 120-122, which further comprise virtual nodes 130-132 and cache services 160-162. Virtual nodes 130-132 may comprise full operating system virtual machines, Linux containers, jails, or other types of virtual containment nodes. Data sources 140 further includes data repositories 141-143, which are representative of any repository stored in HDFS, Google File System, GlusterFS, or some other similar large scale processing file system or object storage.

In operation, an administrator, user, or automated service may generate a new job process 110 to be executed via one or more virtual nodes in LSPE 115. A job process, such as new job process 110, may be distributed across one or more of the virtual nodes, and retrieve data, via cache services 160-162, from data sources 140 for processing. Cache services 160-162 comprise processes that act as an interface between the virtual nodes and the data repositories. For example, a virtual node on host system 120 may request one or more data items. In response to the request, cache service 160 may identify the request, and retrieve the requested data from data sources 140 for processing by the virtual node. Although illustrated separately in the present example, it should be understood that data repositories 141-143 may reside wholly or partially on host systems 120-122.

In the present example, to allocate new job process 110 within LSPE 115, administration node 170 is provided. Administration node 170 is used to determine the appropriate host computing device to handle the processing of the new job process. Here, administration node 170 executes an allocation process to determine the appropriate host system based on data retrieval performance information for each of the host systems in LSPE 115. Accordingly, to initiate a new job process within a host computing system, administration node 170 may receive data retrieval performance information for each of the nodes in the system.

Figure 2:
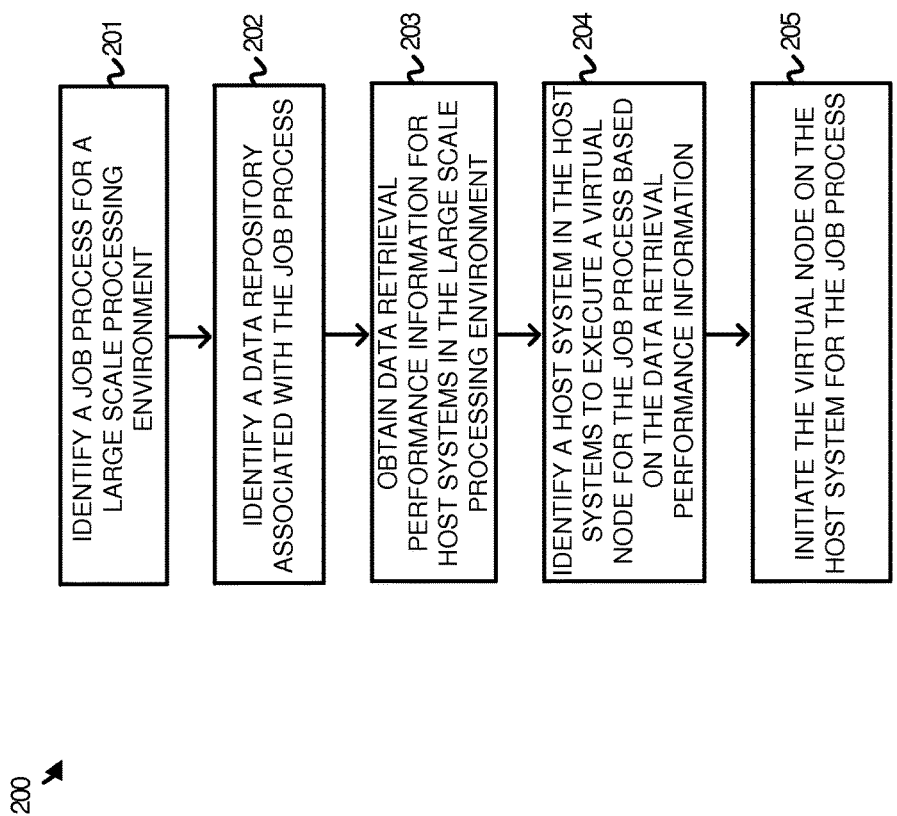
FIG. 2 illustrates a method of operating an administration node to allocate a virtual node based on data retrieval information from host computing systems.

To further demonstrate the operation of administration node 170, FIG. 2 is provided. FIG. 2 illustrates a method 200 of operating administration node 170 to allocate a virtual node for a job process based on data retrieval information from host systems 120-122. The operations of FIG. 2 are referenced parenthetically below.

In FIG. 2, administration node 170 identifies new job process 110 for LSPE 115 (201). This job process may be generated by an administrator or user at administration system 170, may be generated by a user or administrator by a remote console communicatively coupled to administration node 170, or may be generated by an automated process. New job process 110 may comprise a Hadoop job process, a Spark job process, a High Performance Computing Cluster (HPCC) job process, a Disco job process, or some other job process. Once the job process is identified, administration node 170 identifies a data repository associated with the job process (202). For example, referring to FIG. 1, a user may select a job process to execute on data stored in data repository 141.

Once the job process is identified with the data repository, administration node 170 obtains data retrieval performance information for host systems 120-122 in LSPE 115 (203). In some examples, administration node 170 may transfer a query to each host system of host systems 120-122 to determine the performance information related to accessing the data repository. Referring to the example of data repository 141, host systems 120-122 may provide a variety of retrieval information for data repository 141 to administration node 170. This data retrieval information may include information about the physical proximity between the physical hosts and the data repository, information about the ping time between the host systems and the data repository, information about the data bandwidth available between each of the hosts and the data repository, or any other similar data retrieval information.

In response to retrieving the information, administration node 170 identifies a host system in host systems 120-122 to execute a virtual node for new job process 110 based on the data retrieval information (204). In at least one example, as the data is retrieved from each of the host computing systems, administration node 170 determines a score or other value related to the retrieval performance of each of the physical computing systems. This score, determined by an algorithm on administration node 170, allows each of the host systems to be compared to one another. Accordingly, a host might be identified that has the best score related to data retrieval. In some examples, rather than generating a score at administration node 170, scores may be generated at the individual host systems and provided to administration node 170. Thus, the data retrieval information identified by the administration node may comprise a generated data retrieval score for each of the nodes.

Once the host system is identified, administration node 170 may initiate the virtual node on the host system for job process 110 (205). In some examples, to initiate the virtual node, administration node 170 may initiate a new virtual node on the host computing system. In other examples, administration node 170 may allocate the job process to an idle virtual node already executing on the host computing system. As an illustrative example, administration node 170 may identify that host system 120 provides the best data retrieval performance for new job process 110. Responsive to the determination, administration node 170 assigns new job process 110 to host system 120 and initiates execution of the job process.

Although described in the previous example as assigning the job process to a single virtual node, it should be understood that a job process might be assigned to multiple nodes. Thus, rather than identifying a node on a single host system 120-122, similar operations may be used to identify each host system and virtual node necessary for the job process.

Figure 3:
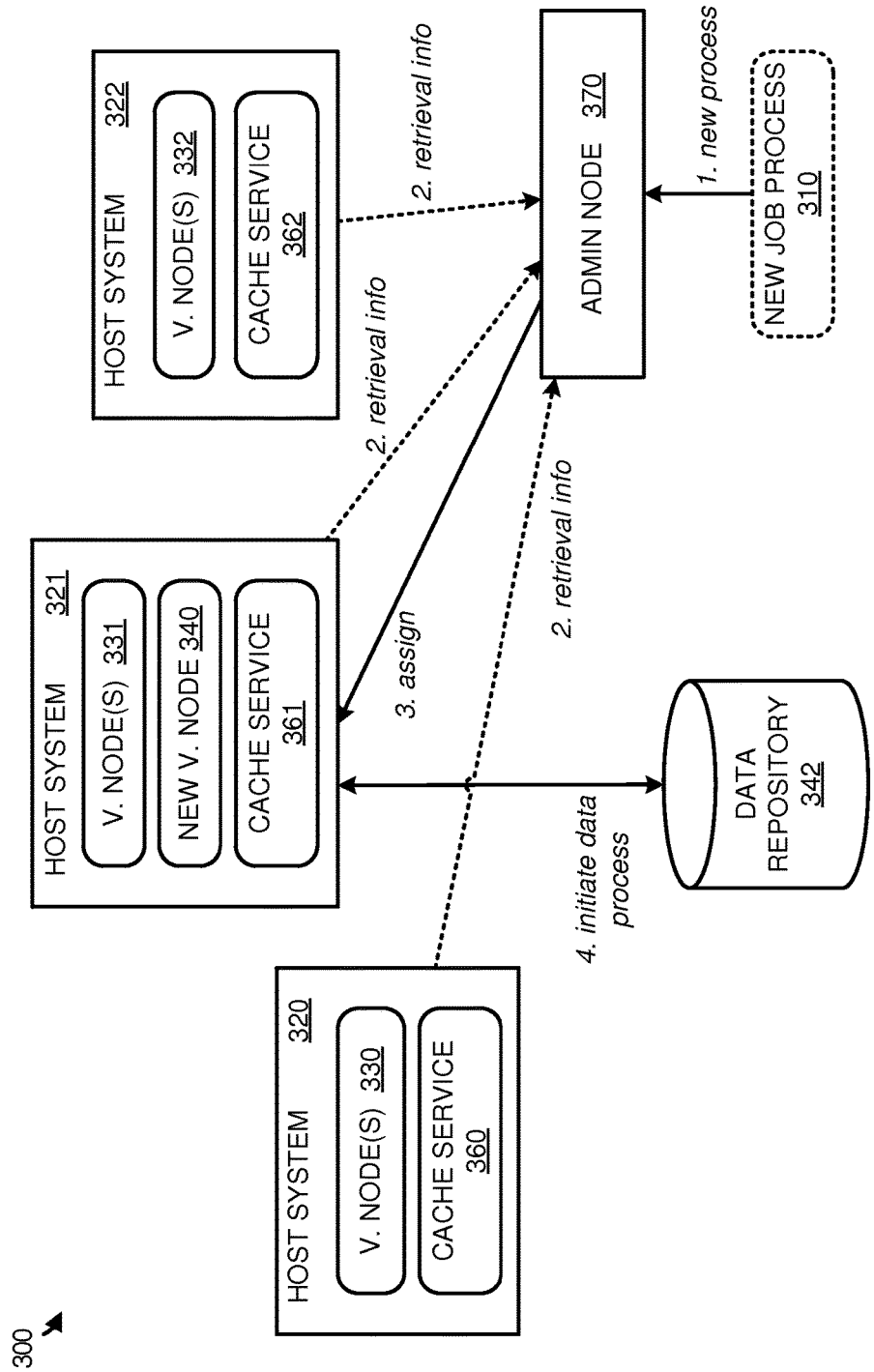
FIG. 3 illustrates an overview of allocating a virtual node based on data retrieval information from host computing systems.

Referring now to FIG. 3, FIG. 3 illustrates an overview 300 of allocating a virtual node based on data retrieval information from host computing systems. Overview 300 includes host systems 320-322, data repository 342, and administration node 370. Host systems 320-322 further include virtual nodes (v. nodes) 330-332, and cache service 360-362.

In operation, host systems 320-322 provide a platform to execute virtual nodes 330-332. Virtual nodes 330-332 operate independently on each of the host systems allowing the hardware of each of the host systems to be more efficiently distributed to each of the processing jobs. To allocate the processing jobs to host systems 320-322, administration node 370 is provided. Administration node 370 may comprise a computing system, or may comprise a virtual node capable of communicating with each host system in a computing environment.

Here, administration node 370 identifies new job process 310 to be added to the computing environment represented by host systems 320-322. This new job process may be defined by an administrator of the computing environment, a user in the computing environment, or by an automated process associated with the computing environment. In response to the request to add the new job process, administration node 370 obtains data retrieval performance information for each host system of host systems 320-322, which is related to the data access performance between each of the hosts and data repository 342. This data access performance information may include the physical distance between the data repository and the host system, the ping time between the host system and the data repository, the amount of bandwidth for the host system to retrieve new information, or any other information related to the data retrieval performance. In some examples, the data retrieval information may be determined entirely based on the information transferred from the hosts, however, it should be understood that administration node 370 might store a portion of the performance information. For example, administration node 370 might store information regarding the physical location of each of the hosts as compared to data repository 342.

Once the data retrieval performance information is determined, administration node 370 identifies a host to allocate a new virtual node. In some instances, administration node 370 may be configured to implement a preconfigured algorithm to determine the appropriate host for a new job process. For example, the algorithm may rate or score the data retrieval information for each of the host computing systems to determine the best host for allocating the new job process. Once host system is identified via the algorithm, administration node 370 may allocate new job process 310 to the identified host system. In the present example, administration node 370 identifies host system 321 to handle new job process 310, and initiates new virtual node 340 for the job process. Upon initiation, new virtual node 340 executes and retrieves data from data repository 342 to provide a desired response to the query presented in new job process 310.

In some examples, such as the example illustrated in FIG. 3, cache services 360-362 may be used as the interface between the virtual processing nodes and the necessary data. For example, a virtual node on a host computing system may request a particular portion of data, and the cache service will retrieve the data and place the data within a portion of memory accessible by the requesting virtual node. As the cache service interfaces with the various data repositories, in some examples, the cache service may also be used as the agent to collect the necessary data retrieval performance information for administration node 370. Accordingly, when the retrieval information is desired, cache services 360-362 on each of the host systems may report the necessary information to the administration node.

Although illustrated in the present example as receiving the retrieval performance information after the identification of the new job process, it should be understood that the retrieval performance information might be retrieved periodically from the hosts in the computing system. For example, host systems 320-322 may maintain performance information about the various available data repositories and periodically report the information to administration node 370.

To further demonstrate the operation of the administration node within the computing environment, FIG. 4 is provided. FIG. 4 illustrates a data structure 400 for identifying a host computing system to allocate a virtual node based on data retrieval information. Data structure 400 includes host computing systems 410, performance information 420-421, and performance scores 430. Host computing systems 410 comprises systems 411-414, performance information 420-421 comprises information 431-438, and performance scores 440 comprises scores 441-444. Although illustrated with two performance information fields, it should be understood that the performance information collected from each of the host computing systems might include any number of fields.

As described herein, host computing systems within a LSPE may execute a plurality of virtual nodes to more efficiently use the computing resources of the physical computing devices. These virtual nodes may be segregated form the data that they attempt to process, allowing each of the virtual nodes and the corresponding hosts to access any data repository designated for processing within the environment. These data repositories may include any repository stored in HDFS, Google File System, GlusterFS, or some other similar large scale processing file system or object storage.

As illustrated herein, because each of the hosts is provided access to each of the available data repositories, a new job process may be assigned to any of the available hosts. To determine which host should be assigned the job process, an administration node may collect data retrieval information corresponding to a data repository necessary for a job process. For example, a new job process may require access to a data repository that uses HDFS. Accordingly, each of the host computing systems within the LSPE may identify retrieval performance information for the HDFS repository, such as the physical relation to the HDFS repository, the ping time length between the host and the HDFS repository, the amount of bandwidth at the host, or any other similar information.

Once the information is identified, the information is transferred to an administration node that assigns the job process to a virtual node on the host based at least partially on the available data retrieval information. Here, the administration node may maintain a data structure, similar to data structure 400, to identify the appropriate host computing system for the job process. In the present example, data structure 400 includes host computing systems 410, which correspond to identifiers for each of the hosts in the LSPE, performance information 420-421, and performance scores 440 for each of the host systems. Performance information 420-421 may comprise any of the data retrieval performance information described herein, which may be determined by the hosts or the administration system. Once the performance information is identified, performance scores 430 may be determined for each of the host computing systems. In some examples, to determine the performance scores, the administration node may include a predefined algorithm to compare the one or more performance information fields and generate a single performance relation between the host computing systems. Once the scores are determined, the administration system may select a host computing system based on the scores and initiate a virtual node on the identified host.

Although illustrated in the present example as a table data structure to identify the appropriate host system, it should be understood that any other form of data structure or method may be used to compile and determine scores for each of the host computing systems. These data structures may include arrays, linked lists, or any other type of data structure. While demonstrated in the present instance with four systems 411-414, it should be understood that LSPEs might include any number of host computing systems.

Figure 5:
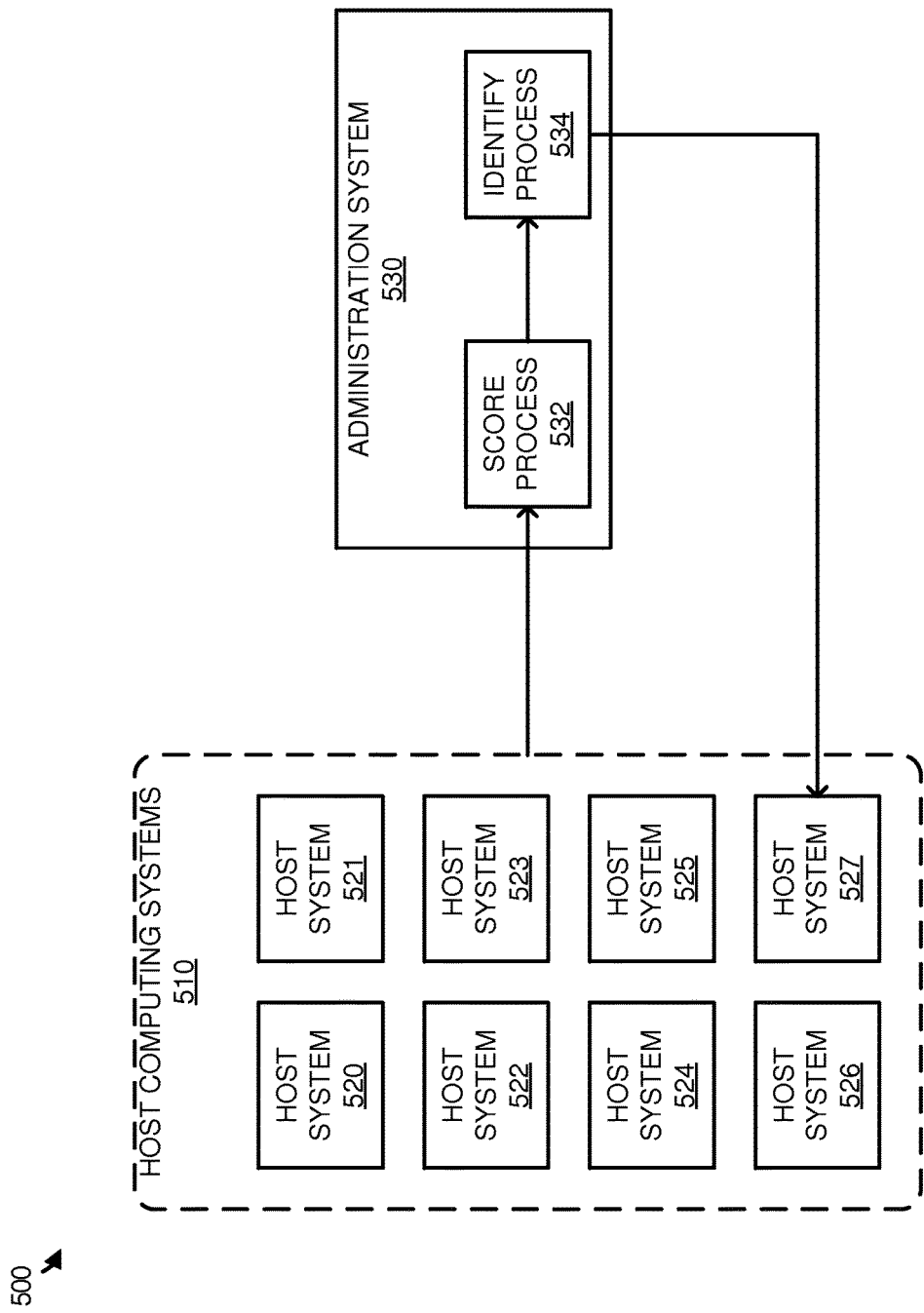
FIG. 5 illustrates an overview of identifying a host computing system for a virtual node based on data retrieval information.

FIG. 5 illustrates an overview 500 of identifying a host computing system for a virtual node based on data retrieval information. Overview 500 includes host computing systems 510 and administration system 530. Host computing systems 510 include host systems 520-527.

In operation, host systems 520-527 are configured to execute one or more virtual nodes to assist in large scale data processing of a plurality of job processes. These job processes may be distributed across one or more of the virtual nodes and process the data in parallel to provide a response to the job process query. As illustrated in FIG. 5, to assign the job processes to host systems 520-527, data retrieval performance information is identified and transferred to administration system 530. This data retrieval performance information is related to a particular data repository associated with a new job process. For example, a new job request may require a data repository stored in GlusterFS format. As a result, the retrieval information that is supplied for this job process by each of host systems 520-527 includes information about the retrieval of data from the particular GlusterFS data repository. This retrieval information for each host may include information about the physical location of the host in comparison to the data repository, the ping time between the host and the data repository, the amount of bandwidth available on the host to retrieve data, or any other similar data retrieval information.

Once the data is transferred, administration system 530 is configured to receive the information from the hosts and score the retrieval information using score process 532. Score process 532 may comprise a predefined algorithm to compare each of the host systems based on the totality of the retrieval information. Accordingly, rather than having a plurality of information for each of host systems, the retrieval information may be narrowed to a single value that combines all of the information. Upon determining the score for each of host systems 520-527, identify process 534 may be used to allocate the job process to a virtual node in host computing systems 510.

As illustrated in the present example, identify process 534 allocates a virtual node on host system 527 for the new job process. Once allocated, the virtual node may execute on the defined data to determine a response for the job process query. Although illustrated in the present example as assigning a single node, it should be understood that in some examples administration system 530 may assign a plurality of virtual nodes for a job process. Thus, the process of identifying the data retrieval information for each of the nodes and allocating the job process may be repeated as many times as necessary to define the adequate number of processing nodes.

Figure 6:
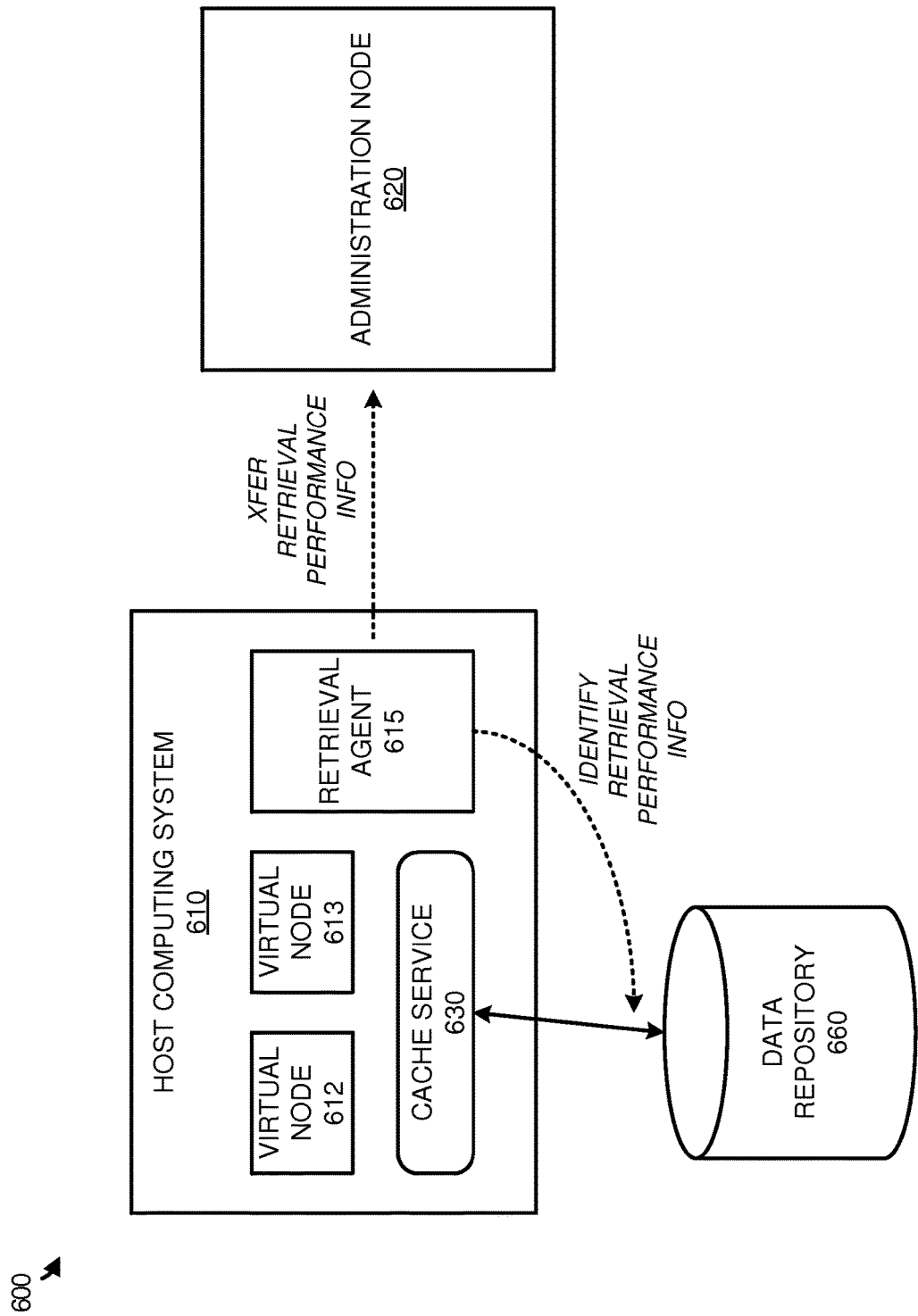
FIG. 6 illustrates an overview of identifying data retrieval information in a host computing system and providing the information to an administration system.

Referring now to FIG. 6, FIG. 6 illustrates an overview 600 of identifying data retrieval information in a host computing system and providing the information to an administration system. Overview 600 includes host computing systems 610, administration node 620, and data repository 660. Host computing system 610 further includes virtual nodes 612-613, retrieval agent 615, and cache service 630.

As described herein, host computing systems, such as host computing system 610, provide a platform for virtual nodes that assist in executing large scale processing jobs. These job processes may require a variety of different data repositories, each with a possible different file system format. Such file system formats may include HDFS format, Google File System format, GlusterFS format, or some other similar large scale processing file system format or object storage format. Further, the data repositories that may need to be accessed by the host systems may be stored on separate computing systems, in separate physical locations. Accordingly, each host computing system may have a different access path to the data stored on the data repositories.

To monitor characteristics of the access path between host computing system 610 and data repository 660, retrieval agent 615 is provided. Retrieval agent 615 gathers data retrieval performance information, such as the ping time, the amount of bandwidth available on host computing system 610 to gather data from repository 660, or other similar performance information. Once the information is identified, retrieval agent 615 may pass the retrieval information to administration node 620, which compares the provided retrieval information to information from other host computing systems. In some examples, retrieval agent 615 may be configured to periodically identify and report retrieval information for the various data repositories available within the environment. However, in other instances, administration node 620 may, in response to identifying a new job process, request the retrieval information from each of the available nodes within the system. In some examples, in addition to the retrieval performance information, retrieval agent 615 may also report an indication if there are enough resources to be allocated a new virtual node. As a result, if resources are not available for the new node, host computing system 610 will not be allocated the job process and node.

As illustrated in the present example, host computing system 610 includes cache service 630. Cache service 630 acts as an intermediary between each of the virtual nodes executing on the host system and the various accessible data repositories. Cache service 630 may be configured to identify a request from a virtual node to retrieve a portion of data from a data repository, retrieve the portion of data from the data repository, and place the data in memory addresses accessible to the virtual node. In some examples, cache service 630 may act as a translator for the virtual nodes to access the appropriate data repository. For instance, the virtual nodes may request data from a data repository using HDFS, although the data repository may be stored using GlusterFS. Accordingly, cache service 630 may translate the HDFS formatted request to GlusterFS format, and provide the data to the appropriate addresses in memory accessible by the virtual node.

Although illustrated separate in the present example, it should be understood that retrieval agent 615 and cache service 630 might be implemented as a single service on host computing system 610. Further, despite not being illustrated in overview 600, it should be understood that if administration node 620 selects host computing system 610 to host a new virtual node, administration node 620 may initiate a new virtual node on host computing system 610 for a job process.

Figure 7:
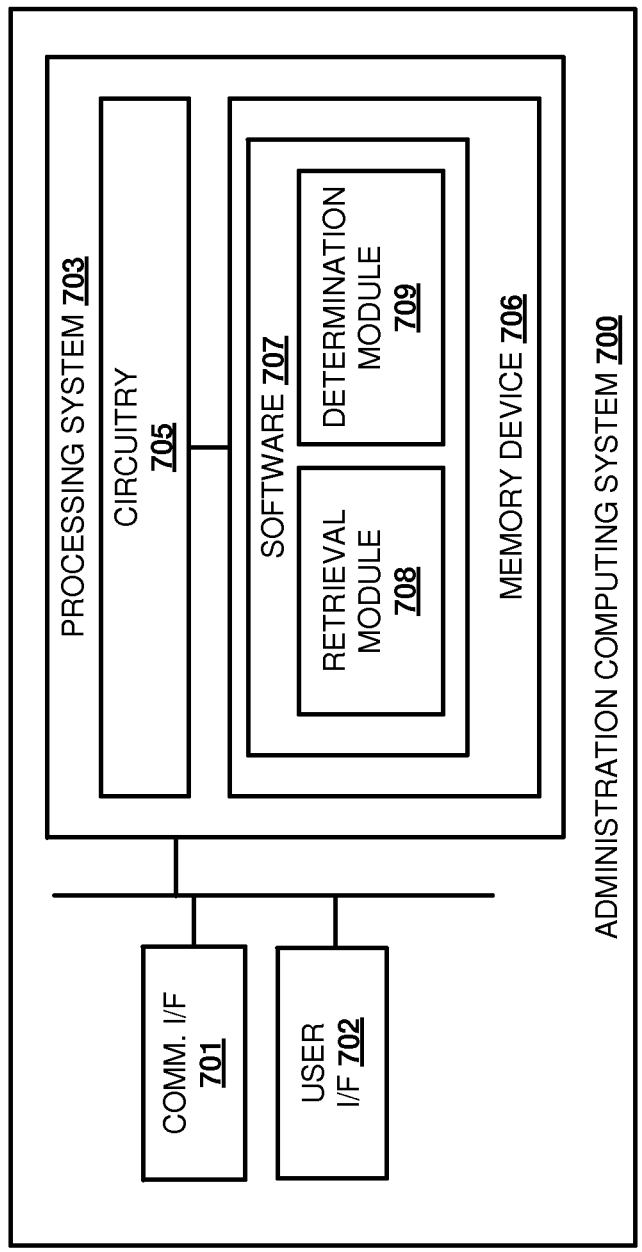
FIG. 7 illustrates an administration computing system to allocate a virtual node based on data retrieval information from host computing systems.

Referring to FIG. 7, FIG. 7 illustrates an administration computing system 700 that is representative of any computing system or systems with which the various operational architectures, processes, scenarios, and sequences disclosed herein for a LSPE administration node may be implemented. Computing system 700 is an example of administration nodes 170, 370, 530, and 620, although other examples may exist. Administration computing system 700 comprises communication interface 701, user interface 702, and processing system 703. Processing system 703 is linked to communication interface 701 and user interface 702. Processing system 703 includes processing circuitry 705 and memory device 706 that stores operating software 707. Administration computing system 700 may include other well-known components such as a battery and enclosure that are not shown for clarity. Computing system 700 may be a personal computer, server, or some other computing apparatus—including combinations thereof.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes retrieval module 708 and determination module 709, although any number of software modules may provide the same operation. Operating software 707 may further include an operating system, utilities, drivers, network interfaces, applications, or some other type of software. When executed by processing circuitry 705, operating software 707 directs processing system 703 to operate administration computing system 700 as described herein.

In particular, operating software 707 directs processing system 703 to identify a job process for a LSPE, and identify a data repository associated with the job process. Retrieval module 708 directs processing system 703 to obtain data retrieval performance information for host systems in the LSPE. Determination module 709 directs processing system 703 to identify a host system in the host systems to execute a virtual node for the job process based on the data retrieval performance information, and initiate the virtual node on the host system for the job process. In some examples, the initiation of the virtual node may include starting a new virtual node on the host computing system, however, in other examples it may include allocating the job process to an idle virtual node on the computing system.

In some instances, the data retrieval performance information may include information regarding the physical location of the host computing systems in comparison to the data repository, the ping time or delay time to contact the data repository for data, the amount of bandwidth available between the host and the data repository, or any other similar retrieval data. Accordingly, to compare the data for all of the hosts within the environment, software 707 may be configured to compile and score the data for each host and compare the scores to one another. Thus, based on the generated scores for each of the hosts, a determination can be made of which host computing system should be allocated the virtual node.

Figure 8:
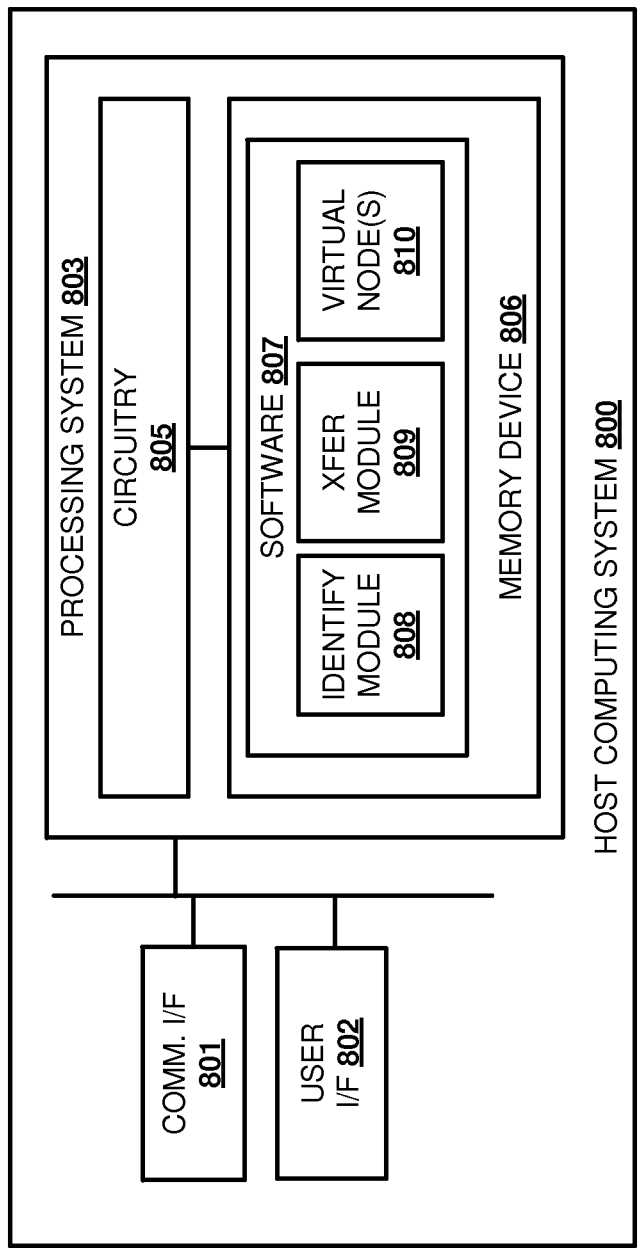
FIG. 8 illustrates a host computing system in a large scale processing environment.

Turning to FIG. 8, FIG. 8 illustrates host computing system 800 that is representative of any host computing system in FIGS. 1-6, although other examples may exist. Host computing system 800 comprises communication interface 801, user interface 802, and processing system 803. Processing system 803 is linked to communication interface 801 and user interface 802. Processing system 803 includes processing circuitry 805 and memory device 806 that stores operating software 807. Host computing system 800 may include other well-known components such as a battery and enclosure that are not shown for clarity. Computing system 800 may be a personal computer, server, or some other computing apparatus—including combinations thereof.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes identify module 808 and transfer module 809, although any number of software modules may provide the same operation. Operating software 807 further includes virtual nodes 810 used to execute large scale processing jobs, and may further include an operating system, utilities, drivers, network interfaces, applications, or some other type of software. When executed by processing circuitry 805, operating software 807 directs processing system 803 to operate host computing system 800 as described herein.

In particular, operating software 807 directs processing system 803 to provide data retrieval performance information to an administration system to allow the administration system to allocate a job process. Identify module 808 identifies data retrieval information relating to the host and a designated storage repository. This information may include the physical proximity of the host to the repository, the ping time between the host and the repository, the amount of bandwidth available to retrieve data from the repository, or any other similar information. Once identified, transfer module 809 transfers the information to the administration node, allowing the administration node to select a host computing system for initiating a virtual node. Accordingly, if host computing system 800 were selected, a new virtual node in virtual nodes 810 may be initiated for a job process identified by the administration node.

Returning to the elements of FIG. 1, host systems 120-122, administration node 170, and data repositories 141-143 may each include communication interfaces, network interfaces, processing systems, computer systems, microprocessors, storage systems, storage media, or some other processing devices or software systems, and can be distributed among multiple devices. Host systems 120-122 and data repositories 141-143 may comprise server computers, desktop computers, laptop computers, or any other similar computing system, including combinations thereof. Although illustrated separate in the present example, it should be understood that data repositories 141-143 may be stored on the same computing devices as host systems 120-122. Administration node 170 may comprise a server computer, a desktop computer, or other similar computing system, including virtual representations thereof. LSPE 115 may communicate with data sources 140 and administration node 170 via Time Division Multiplex (TDM), Internet Protocol (IP), Ethernet, optical networking, wireless protocols, communication signaling, or some other communication format—including combinations thereof.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus to allocate job processes to a plurality of host computing systems in a large scale processing environment, the apparatus comprising:
   one or more non-transitory computer readable storage media;
   processing instructions stored on the one or more non-transitory computer readable storage media that, when executed by a processing system, direct the processing system to at least:
   identify a job process for the large scale processing environment;
   identify a data repository associated with the job process from a plurality of data repositories, wherein the data repository is stored across a plurality of computing systems;
   obtain data retrieval performance information related to the data repository from a cache service executing on each host computing system in the plurality of host computing systems, wherein the data retrieval performance information comprises at least ping time information for accessing the data repository by each cache service, and wherein the cache service acts as an intermediary between virtual nodes executing on a corresponding host computing system and the plurality of data repositories to access data for the virtual nodes;
   identify a host computing system in the plurality of host computing systems to execute a virtual node for the job process based on the data retrieval performance information; and
   initiate the virtual node on the host computing system for the job process.

2. The apparatus of claim 1 wherein the data retrieval performance information further comprises bandwidth information in accessing the data repository, and physical proximity information to the data repository.

3. The apparatus of claim 1 wherein the job process comprises a Hadoop job process.

4. The apparatus of claim 1 wherein the virtual node for the job process comprises a virtual machine for the job process.

5. The apparatus of claim 1 wherein the virtual node for the job process comprises a virtual container for the job process.

6. The apparatus of claim 1 wherein the processing instructions to identify the data repository associated with the job process direct the processing system to identify a storage location of the data repository associated with the job process.

7. The apparatus of claim 1 wherein the apparatus further comprises the processing system.

8. A method of operating an administration node to allocate job processes to a plurality of host computing systems in a large scale processing environment, the method comprising:
   identifying a job process for the large scale processing environment;
   identifying a data repository associated with the job process from a plurality of data repositories, wherein the data repository is stored across a plurality of computing systems;
   obtaining data retrieval performance information related to the data repository from a cache service executing on each host computing system in the plurality of host computing systems, wherein the data retrieval performance information comprises at least ping time information for accessing the data repository by each cache service, and wherein the cache service acts as an intermediary between virtual nodes executing on a corresponding host computing system and the plurality of data repositories to access data for the virtual nodes;
   identifying a host computing system in the plurality of host computing systems to execute a virtual node for the job process based on the data retrieval performance information; and
   initiating the virtual node in the host computing system for the job process.

9. The method of claim 8 wherein the data retrieval performance information further comprises bandwidth information in accessing the data repository, and physical proximity information to the data repository.

10. The method of claim 8 wherein the job process comprises an Apache Hadoop job process, an Apache Spark process, or a Disco process.

11. The method of claim 8 wherein the virtual node for the job process comprises a virtual machine for the job process.

12. The method of claim 8 wherein the virtual node for the job process comprises a virtual container for the job process.

13. The method of claim 8 wherein identifying the data repository associated with the job process comprises identifying a storage location of the data repository associated with the job process.

14. The method of claim 8 wherein the plurality of data repositories comprise repositories stored using distributed file systems.

15. A system to allocate job processes amongst a plurality of host computing systems, the system comprising:
   an administration node with a first processing system configured to:
      identify a job process for the plurality of host computing systems;
      identify a data repository from a plurality of data repositories associated with the job process, wherein the data repository is stored across a plurality of computing systems;
      transfer a request for data retrieval performance information related to the data repository to each host computing system in the plurality of host computing systems;
   the plurality of host computing systems each with a second processing system executing a cache service and configured to:
      receive the request;
      identify the data retrieval performance information related to the data repository, wherein the data retrieval performance information comprises at least ping time information for accessing the data repository by each cache service, and wherein the cache service acts as an intermediary between virtual nodes executing on a corresponding host computing system and the plurality of data repositories to access data for the virtual nodes;
      transfer the data retrieval performance information to the administration node;
   the administration node with the processing system further configured to:
      receive the data retrieval performance information related to the data repository from each host computing system in the plurality of host computing systems;
      identify a host computing system in the plurality of host computing systems to execute a virtual node for the job process based on the data retrieval performance information; and
      initiating the virtual node in the host computing system for the job process.

16. The system of claim 15 wherein the data retrieval performance information further comprises bandwidth information in accessing the data repository, and physical proximity information to the data repository.

17. The system of claim 15 wherein the job process comprises an Apache Hadoop job process, an Apache Spark process, or a Disco process.

18. The system of claim 15 wherein the administration node with the first processing system configured to identify a data repository associated with the job process is configured to identify a storage location of the data repository.

19. The system of claim 15 wherein the virtual node for the job process comprises a virtual machine for the job process.

* * * * *